United States Patent
Hahn et al.

(10) Patent No.: US 8,977,783 B2
(45) Date of Patent: Mar. 10, 2015

(54) HIGH-SPEED SECURE CONTENT TRANSFER TO SD CARD FROM KIOSK

(75) Inventors: Mark P. Hahn, Issaquah, WA (US); Daniel V. Bolstad, Seattle, WA (US); Joseph P. Zipperer, Seattle, WA (US)

(73) Assignee: Media IP, LLC, Seattle, WA (US)

( * ) Notice: Subject to any disclaimer, the term of this patent is extended or adjusted under 35 U.S.C. 154(b) by 900 days.

(21) Appl. No.: 12/906,938

(22) Filed: Oct. 18, 2010

(65) Prior Publication Data

US 2011/0093622 A1   Apr. 21, 2011

Related U.S. Application Data

(60) Provisional application No. 61/253,789, filed on Oct. 21, 2009.

(51) Int. Cl.
  *G06F 3/00* (2006.01)
  *G06F 17/30* (2006.01)
  *G06Q 30/06* (2012.01)

(52) U.S. Cl.
  CPC .... *G06F 17/30038* (2013.01); *G06F 17/30058* (2013.01); *G06Q 30/06* (2013.01)
  USPC ........................................................ 710/13

(58) Field of Classification Search
  USPC ........................................................ 710/13
  See application file for complete search history.

(56) References Cited

U.S. PATENT DOCUMENTS

| | | | |
|---|---|---|---|
| 6,697,944 B1 | 2/2004 | Jones et al. | |
| 6,859,791 B1 | 2/2005 | Spagna et al. | |
| 7,360,088 B2 | 4/2008 | Mishina et al. | |
| 7,505,584 B2 | 3/2009 | Kamibayashi et al. | |
| 7,779,064 B2 | 8/2010 | Phillips | |
| 7,844,831 B2 | 11/2010 | Benhammou et al. | |
| RE42,019 E | 12/2010 | Tagawa et al. | |
| 8,306,918 B2* | 11/2012 | Farrugia et al. | 705/57 |
| 8,312,294 B2 | 11/2012 | Sato et al. | |
| 2002/0126841 A1 | 9/2002 | Arai | |
| 2003/0220835 A1 | 11/2003 | Barnes, Jr. | |
| 2004/0010601 A1 | 1/2004 | Afergan et al. | |
| 2005/0044280 A1 | 2/2005 | Reisman | |
| 2006/0156355 A1 | 7/2006 | Kawasaki et al. | |
| 2007/0033344 A1 | 2/2007 | Tanaka | |
| 2007/0192634 A1* | 8/2007 | Cheon et al. | 713/193 |

(Continued)

OTHER PUBLICATIONS

Young; International Search Report for PCT/US07/22007; mailed May 5, 2008; 1 page.

(Continued)

*Primary Examiner* — Chun-Kuan Lee
(74) *Attorney, Agent, or Firm* — Lowe Graham Jones PLLC; Ellen M. Bierman (57) ABSTRACT

A system and a method are disclosed for quickly and securely transferring media files to an SD card from a kiosk. The kiosk includes a customer interface module for receiving a selection of a media file to transfer, a transaction module for accepting payment, a media file processing module for preparing the media file to be written to the SD card, and a high-speed secure SD card writer that can write to both an unsecure area and a secure area of the SD card. All data is written to the unsecure area before data is written to the secure area to improve speed. Optionally, the kiosk includes a firmware update module for distributing firmware updates through the SD cards, and the ability to play previews to attract customers and entertain them while transferring media files to the SD card.

18 Claims, 3 Drawing Sheets

(56) References Cited

U.S. PATENT DOCUMENTS

| | | |
|---|---|---|
| 2007/0234341 A1 | 10/2007 | Chang et al. |
| 2008/0075437 A1 | 3/2008 | Hamada et al. |
| 2008/0098239 A1 | 4/2008 | Wada et al. |
| 2008/0133546 A1 | 6/2008 | Phillips |
| 2008/0270796 A1 | 10/2008 | Suu et al. |
| 2008/0271154 A1 | 10/2008 | Kamada et al. |
| 2009/0086978 A1* | 4/2009 | McAvoy et al. .............. 380/279 |
| 2009/0164709 A1 | 6/2009 | Lee et al. |
| 2009/0282454 A1 | 11/2009 | Ekstrand |
| 2009/0313432 A1 | 12/2009 | Spence et al. |
| 2010/0127013 A1* | 5/2010 | Butler .............................. 221/1 |
| 2010/0262912 A1 | 10/2010 | Cha |
| 2010/0293581 A1 | 11/2010 | Robert |
| 2010/0297933 A1 | 11/2010 | Sim |
| 2011/0091187 A1 | 4/2011 | Duffin et al. |
| 2011/0197131 A1 | 8/2011 | Duffin et al. |
| 2012/0124390 A1 | 5/2012 | Zipperer et al. |
| 2012/0137135 A1 | 5/2012 | Kasahara et al. |
| 2012/0254629 A1 | 10/2012 | Zipperer et al. |
| 2012/0272065 A1 | 10/2012 | Matsukawa et al. |
| 2012/0315019 A1 | 12/2012 | Zipperer et al. |
| 2012/0324244 A1 | 12/2012 | Zipperer et al. |

OTHER PUBLICATIONS

Android Developers Guide, Android Software Developers Kit (SDK), Android Version 1.543, Nov. 13, 2009, pp. 1-24. Available online at >netmite.com/android/mydroid/1.6/out/target/common/docs/offline-sdk/offline.html<.

* cited by examiner

HIGH-SPEED SECURE CONTENT TRANSFER TO SD CARD FROM KIOSK

CROSS REFERENCE TO RELATED APPLICATIONS

This application claims the benefit of U.S. Provisional Application No. 61/253,789, filed Oct. 21, 2009, titled "High-Speed Secure Content Transfer to SD Card from Kiosk," the contents of which is incorporated by reference in its entirety.

BACKGROUND

1. Field of Art

The disclosure generally relates to the field of distributing digital media content via a kiosk.

2. Description of Art

As the popularity of digital media content has increased, so has the demand for acquiring digital media content in quick, convenient ways. One method of distributing digital media content is though kiosk systems. A kiosk is placed where it is accessible to customers. The kiosk is connected via a network to one or more servers having access to storage of digital media content. Customers can interact with the kiosk, for example through a touch screen interface, to select desired digital media content for purchase. The desired digital media content is located either in a storage local to the kiosk or in a remote storage and served to the kiosk. Then, the desired digital media content is downloaded to a storage medium, for example the memory in a customer's digital playback device that has been connected to the kiosk, or another computer-readable medium such as a CD or DVD.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes expediting the download of digital media content from a kiosk to a secured digital (SD) card. A SD card comprises a media device having computer readable and writable storage areas with a secure area and an unsecure area thereon. In one embodiment the storage area is comprised of a flash memory.

A download (or write) of digital media content to the SD card comprises a manufacture or creation of an SD card with specified content. The download in one embodiment is by pre-allocating space for the digital media content and prioritizing the writing of the media file. After an initial set-up of the SD card by writing a user key, all data in an unsecure area of the SD card is written prior to writing any data in the secure area of the SD card. Thus, large media files can be written to removable media quickly with lower risk to the rights holders.

One embodiment of the system includes a configuration for high speed secure writing to an SD card. One implementation of the SD card writer contains the functionality to enable high-speed writing and the functionality to enable writing to a secure portion of the SD card.

Another embodiment includes the ability to distribute firmware updates for playback devices through downloads from a kiosk to the SD cards. When the SD card is inserted into a playback device, the playback device determines whether the version of the firmware on the SD card supersedes the version of the firmware on the playback device and if it does, the playback device installs the newer version from the SD card. In other embodiments, for example, configurations using a personal computer software playback player (or application) for playback of content from the SD card, the kiosk may download updates to the software playback player to the SD card. When the SD card is inserted into the personal computer and the playback player is ready to launch, the personal computer playback player installs the update of the playback player from the SD card. Likewise, other consumer applications may be loaded through the kiosk configuration described herein. It is noted that although reference is made to a personal computer, the personal computer includes devices having other form factors that may be configured with a software playback player, for example, a tablet computer, a netbook computer, a mobile phone or a smartphone. In addition, it is noted that the physical form factor of the SD card may be appropriately adjusted for the particular computing environment. For ease of discussion throughout the specification, reference to firmware update is understood to be software playback player updates for configurations using a personal computer playback player.

According to another embodiment, the kiosk can include digital sign and vending functionalities in a single unit. While not actively being used by a customer, the kiosk may function as a digital sign to attract customers by playing previews of media files that are currently available for download from the kiosk. Then, if a customer is attracted by the preview to the content on the kiosk, the customer can immediately purchase the item from the same kiosk.

According to yet another embodiment, the kiosk can allow a customer to preview other media content of the customer's choice while downloading content to the SD card. Thus, the customer can be entertained by content of the customer's choice while waiting.

Example Kiosk Distribution Configuration

Figure 1:
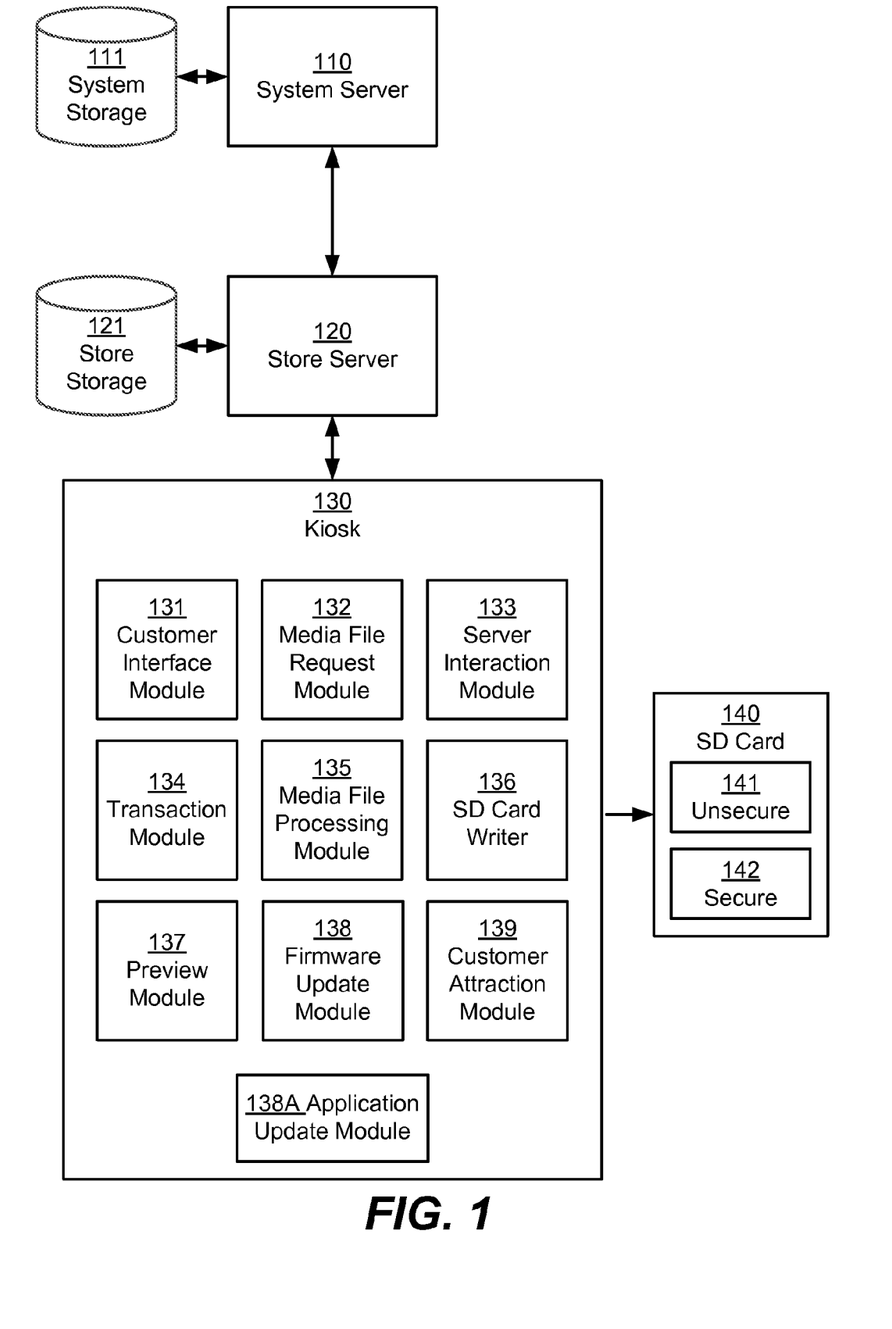
FIG. 1 illustrates an example embodiment of a kiosk distribution system.

FIG. 1 illustrates an example embodiment of a kiosk distribution system 100. The kiosk distribution system 100 includes a system server 110 connected to a system storage 111, at least one store server 120 connected to a store storage 121, and at least one kiosk 130 connected to a store server 120. Although only one store server 120 and one kiosk 130 are shown in the example system 100 of FIG. 1, in some embodiments, the kiosk distribution system includes many store servers 120 at different retail locations. In addition, each retail location can include many kiosks 130 connected to a store server 120. One or more communications networks, such as an intranet, the Internet, a local area network, a wide area network, a wireless network, or any other data network such as a cellular network connect the system server 110 to at least one store server 120 and the store server 120 to at least one kiosk 130. The customer connects an SD card 140 to a kiosk 130 in order to download media content to the SD card through the kiosk 130 from the distribution system 100. Kiosks and servers can be contained in one or more physical devices as necessary to meet cost, size, security, and other constraints.

The system storage 111 stores media files for distribution to stores through the system server 110. In one embodiment, the system storage 111 includes a database, system files, and user files stored on any combination of storage media. The media files stored in the system storage 111 can include audio, visual, and audio-visual files, for example, music, music videos, movies, television shows, video games, electronic books, etc. The media files may be stored at various quality standards and in various formats in order to accommodate various playback devices. In one embodiment, the process of loading the media files into the system storage 111 is referred to as "ingesting." During the ingest process, the playable content of the media file is stored along with metadata. Metadata includes the title of the playable content, and expanded descriptive information about the content, such as the actors, the director, and/or other information that may appear on or inside a DVD box, for example. In one embodiment, during the ingest process, the industry standard Content Protection for Recordable Medium digital rights management (CPRM DRM) specification of information such as a content description, and a content key is also stored for each media file.

The system server 110 accesses the media files stored in the system storage 111 and distributes them to at least one store server 120 in response to a request for the media file from the store server 120, or based on pre-established distribution policies under which the system server 110 operates. The pre-established distribution policies may be pre-stored in a storage device of the kiosk 120 or in the store server 120 (to which the kiosk is communicatively coupled).

The store server 120 receives media files from the system server 110, either based on a request from the store server 120 or based on pre-established distribution policies, and the store server 120 stores the media files in the store storage 121. In one embodiment, the store storage 121 includes a database, system files, and user files stored on any combination of storage media. The store server 120 also accesses the stored media files from the store storage 121 in order to deliver them to a kiosk 130 in response to requests from the kiosk 130.

The kiosk 130 receives selections of media from customers, requests selected media files from the store server 120, and receives the media files in response to the requests, and writes the media files to the customer's SD card 140. In one embodiment, the kiosk 130 includes a customer interface module 131, a media file request module 132, a server interaction module 133, a transaction module 134, a media file processing module 135, an SD card writer 136, a preview module 137, a firmware update module 138, and a customer attraction module 139.

The customer interface module 131 manages a graphical user interface presented to a customer, through which, the customer can select media to preview at the kiosk 130 or download to the customer's SD card 140. The customer interface module 131 receives user selections of media for download, for example, by interpreting the user's interactions with a touch screen display of the kiosk 130 or though the user's alphanumeric input into a keyboard, button selections, or selections using a pointing device such as a computer mouse. The customer interface module 131 passes the user's selections to the media file request module 132.

The media file request module 132 prepares requests for media files. The media file request module 132 receives the user's selections of media from the customer interface module 131 and prepares a request for the corresponding media files, for example, by performing a lookup of the selected media file.

The server interaction module 133 manages communications between the kiosk 130 and the store server 120. Specifically, the server interaction module 133 receives requests for media files from the media file request module 132 (for example by content availability date) and communicates them to the store server 120. The server interaction module 133 also receives media files from the store server 120 that are distributed to the kiosk 130.

The transaction module 134 manages the payment details of the customer's purchase from the kiosk 130. The transaction module 134 receives the customer's payment information, for example from information read from the swipe of a card through a card reader (not shown) of the kiosk 130. Alternatively the transaction module 134 can receive the customer's payment information as entered by the customer through alphanumeric or other input into the kiosk 130. The transaction module 134 then processes the customer's payment according to the payment information received. The transaction module 134 then verifies and confirms the customer's payment.

The media file processing module 135 processes media files in preparation for writing the files to SD cards 140. The media file processing module 135 receives the requested media files from the store server 120 via the server interaction module 133. The media file processing module 135 then queues the media file for download to the SD card 140. It is noted that the SD card can be provided by the customer (for insertion into an SD card slot of the SD card writer 136 or otherwise communicatively coupled to the SD card writer, such as through a USB adaptor attached to a USB port of a kiosk 130) or may be provided through a kiosk that includes a pre-retained (e.g., stacked) quantity of SD cards that can be inserted into the SD card writer 136 and subsequently discharged for the customer when the process described herein completes writing to the SD card.

Continuing on, the SD card writer 136 writes the media file to the SD card 140 in compliance with the standards of security known as Content Protection for Recordable Media (CPRM) for controlling the copying, moving, and deletion of digital media. In one embodiment, the SD card writer 136 is a high-speed writer capable of writing data to both an unsecured area (or user area) 141 of the SD card as well as a secure area (or protected area) 142 of the SD card as needed for CPRM for SD cards. The operation of the media file processing module 134 and the SD card writer 136 will be described in greater detail with reference to FIG. 3.

The preview module 137 manages the playback of previews of media files that are available for purchase. The preview module 137 can operate in parallel with the SD card writer 136 so that a customer can preview other media files of the customer's choice while the customer's selected media file is downloading to the SD card 140. Alternatively, the preview module 137 can show a customer a preview selected randomly or selected based on the content that the customer is downloading. Previews may also constitute advertisements, training materials, or any such purpose that can be included into a video. Advantageously, the preview module 137 can show previews without affecting the performance of the SD card writer 136. In one embodiment, the SD card write process is designed to use a low amount of resources to avoid contention with the preview module 137.

The firmware update module 138 receives firmware updates (e.g., firmware software updates) (or application update module 138A if software playback application is configured within system) for use in updating firmware on the playback devices that use the SD cards 140. The firmware updates are disseminated by the system server 110 through the store server 120 to the kiosk 130. The firmware update module 138 queues firmware updates to be written by the SD card writer 136 to the SD card 140, for example during or after the media file is written. It is noted that the kiosk will only provide firmware update if the version stored on the kiosk is newer than the version on the SD card. In one embodiment, the firmware update code is obfuscated (e.g., scrambled, cryptographically concealed) and signed to prevent tampering. Subsequently, when the SD card 140 is inserted into a playback device, the playback device checks to see if the version of the firmware on the SD card supersedes the version of the firmware currently on the playback device, and if it does, then the firmware update is loaded onto the playback device. Thus, through the SD card, a mechanism is provided to update firmware present on a playback device without requiring the playback device to have any network connection. It is noted that this is an optional process to update firmware on devices that playback SD cards created (or manufactured) with stored media as described herein.

The customer attraction module 139 enables the kiosk 130 to function as a digital sign, for example, while a customer is not actively engaging in the selection or download of media files. Through the kiosk 130, the customer attraction module 139 plays previews, such as movie previews, short segments of media files, and/or advertisements to download particular media files, in order to entice customers to make a purchase. Advantageously, the customer attraction module 139 can be programmed to only play previews from, segments of, or advertisement for media files, or training media files on how to use the system in addition to videos, that are currently available for download from the kiosk 130. The customer attraction module 139 can be synchronized with the content of the system storage 111 so that the kiosk 130 is only attracting customers to purchase items that are available immediately for purchase. In one embodiment, the customer attraction module 139 plays a loop of previews configured based on data available at the store server 120, which is a subset of the data available on the system server 110. For example, an operator of the system server 110 uses the system server 110 to make updates to the list of previews and/or advertisements in the storage 111. The system server 110 and the store server 120 work in concert to move these updates first to the store storage 121 and then to the kiosk 130. These updates then propagate to the list of previews and/or advertisements displayed by the preview module 137. This allows a system operator at a central location to update the previews and/or advertisements displayed in many kiosks 130 located in many different physical locations.

Computing Machine Architecture

Figure 2:
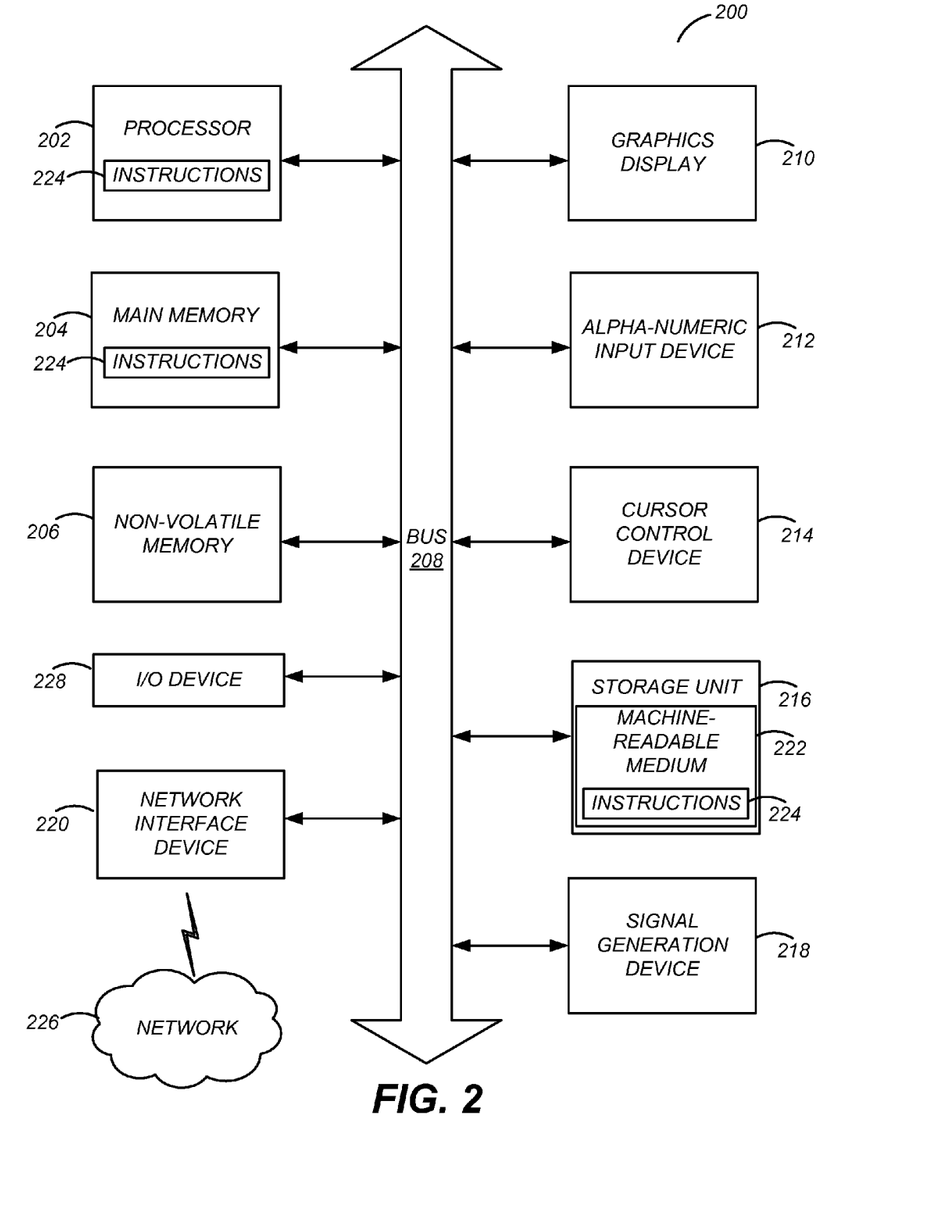
FIG. 2 illustrates one embodiment of components of an example machine able to read instructions from a machine-readable medium and execute them in a processor (or controller) for use as a server or a kiosk.

FIG. 2 is a block diagram illustrating components of an example machine able to read instructions from a machine-readable medium and execute them in a processor (or controller). The example machine as described provides the machine structure for executing functionality of the components of the example kiosk distribution configuration. For example, the machine is configured for use as a system server 110, a store server 120, and/or kiosk 130. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), one or more application specific integrated circuits (ASICs), one or more radio-frequency integrated circuits (RFICs), or any combination of these), a main memory 204, and a non-volatile memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), an input/output (I/O) device 228, and a network interface device 220, which also are configured to communicate via the bus 208. It is noted that in one embodiment the I/O device 228 can be a hardware component configured to read and write to SD cards. The hardware component is configured to physically couple with the SD card so that the SD card communicatively couples with the computer system 200.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Downloading Media Files to an SD Card

Figure 3:
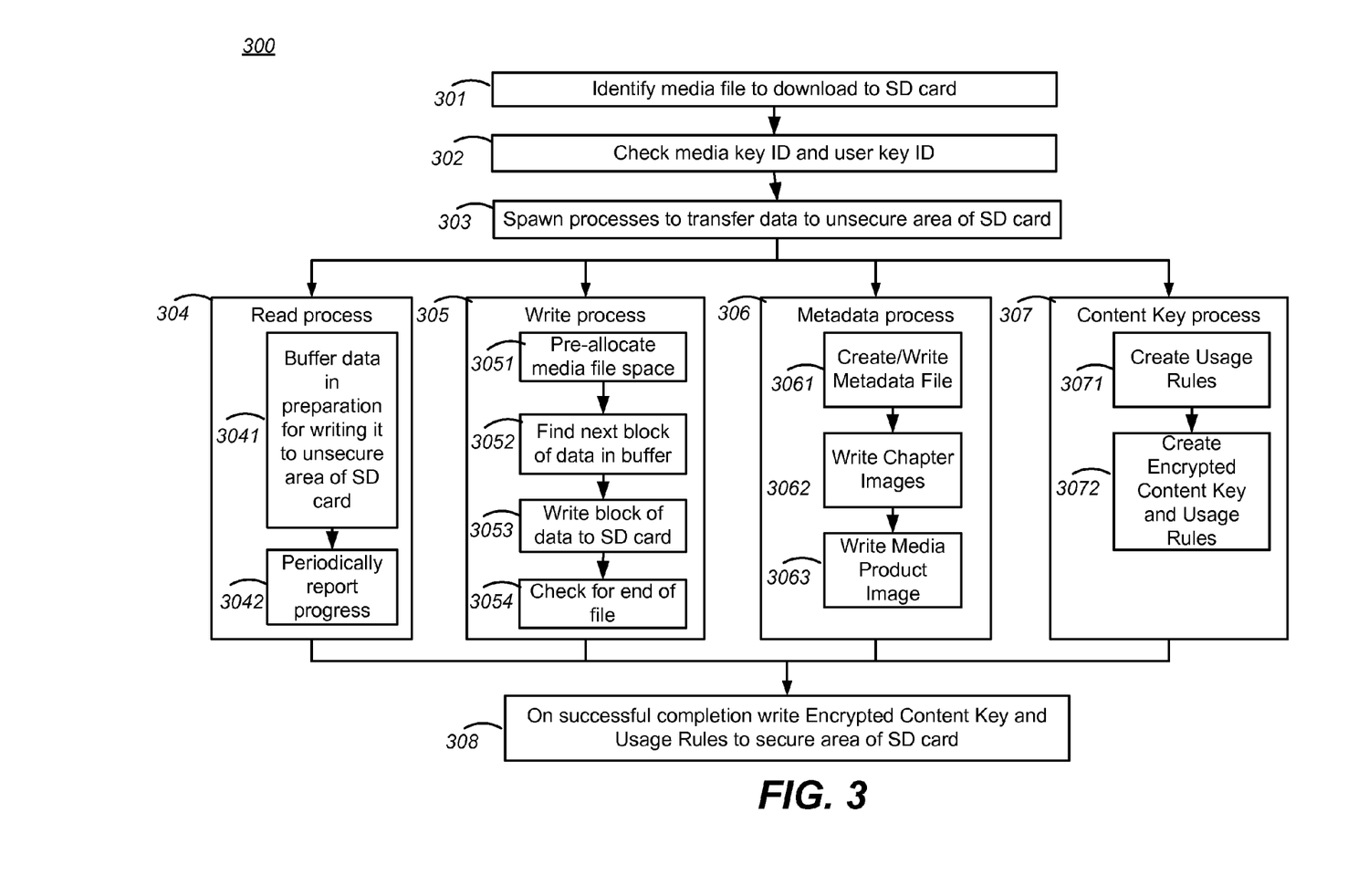
FIG. 3 illustrates an example embodiment of a method of operating a media file processing module and an SD card writer.

FIG. 3 illustrates an example embodiment of a method 300 of operating a media file processing module 135 and an SD card writer 136. The goal is to quickly and securely transfer media files, for example a digital version of a movie, from a kiosk 130 to an SD card 140. The example method of FIG. 3 will be described herein with reference to transferring a selected movie purchased from a kiosk 130 to be loaded onto an SD card 140 to be watched later by a customer on a playback device. The method 300 described herein can also be used to transfer other media files from a kiosk 130 to an SD card 140 securely and at high-speed. Further, in this example, the method 300 configured to function within the kiosk 130 is configured with functional components of the machine, e.g., the computer system 200, as described in FIG. 2.

In step 301, the media file to download to the SD card is identified. The media file may be identified by a customer through a selection using the customer interface module 131 of the kiosk 130. In one embodiment, the media file to download includes three portions: 1) a playable content portion that contains the audio and/or video presentation of the content (i.e., the movie itself in this example); 2) a metadata portion that contains the metadata associated with the media file (e.g., metadata such as the title of the playable content, and expanded descriptive information about the content, such as the actors, the director, and/or other information that would normally appear on a DVD box, as described above); and 3) a portion that contains the information required by CPRM for SD cards to properly protect the playable content. In most instances, the playable content portion is vastly larger than the metadata portion and the CPRM for SD cards information portion.

Regarding the third portion, one example embodiment of CPRM for SD cards requires the playable content portion of the media file to be encrypted with a "content key." The content key cannot be stored in the clear or be easily obtainable or the playable content is not truly protected. Thus, CPRM for SD cards specifies the content key is encrypted with a "user key." This user key must also be encrypted. The user key is encrypted with the SD card's "media key" in an operation which can only be performed on the SD card through special interactions with the SD card's secured area 142. In short, CPRM for SD cards specifies the SD card's media key encrypts the user key which encrypts the content key which encrypts the playable media. The kiosk 130 software modules do not access the actual keys because they are handled only in the secured area 142 of the SD card 140, but refer to all these keys by identifiers: the media key ID, the user key ID and the content key ID. CPRM for SD cards specifies that the card's media key encrypts the user key which encrypts the content key which encrypts the playable media. The media key ID is a unique identifier for the SD card, such as a serial number. The user key ID is a unique identifier for a key required by CPRM for SD cards as part of the chain of protection for the content and is assigned the first time a user transfers content to a particular SD card from the kiosk distribution system 100 or whenever a compatible user key is not present. The content key ID is an identifier for a key that enables a playback device to playback the playable content portion of the media file.

The third portion of the media file to download also includes the usage rules. The usage rules are a set of rules specifying the access rights to the playable content portion of the media file that have been purchased by the customer. For example, the usage rules may specify the rental period, the number of times the movie can be watched, the period of time allowed between beginning to playable the movie and completing the playback of the movie, etc.

In step 302, the media key ID and user key ID are checked. The media key ID is retrieved and the user key ID is retrieved or assigned so that they are available to be written to the SD card as part of the third portion of the media file. The user key is written to the secure area 142 of the SD card 140 as part of initial set-up of the SD card. Thereafter, it need not be written again for subsequent uses of the SD card 140.

In step 303, four processes are spawned to transfer data to an SD card 140. First data is transferred to the unsecure area 141 of the SD card 140. Thereafter, data is written to the secure area 142 of the SD card 140.

In step 304, the read process operates by first buffering 3041 data in preparation for writing it to the unsecure area 141 of the SD card 140. In one embodiment, the read process 304 and the write process 305 share a circular buffer. The read process 304 must always stay at least one buffer ahead of the write process 305 so that the write process never pauses to wait for the read process 304 in order to obtain optimal speed. However, at the same time, the read process 304 must also not get too far ahead of the write process 305 because they share a circular buffer. The read process 304 should not delete data in a buffer (in order to refill it) unless the write process 305 has already written the data in the buffer to the SD card 140.

As the read process 304 buffers 3041 data in preparation for writing, the read process 304 periodically reports 3042 the progress of the file transfer. Thus, the progress reports can be used to keep the customer updated on the status of the file transfer, in order to prevent the customer from becoming needlessly frustrated and aborting the transfer.

As the read process 304 is executing, the write process 305 begins executing. In step 3051, space is optionally pre-allocated for the media file. Typically, a large media file stored on an SD card includes multiple directory blocks and many data blocks. Each directory block points to a plurality of data blocks. In one example embodiment, a data block is a 512-byte data block. If space is not pre-allocated, the directory blocks may be mixed in among the data blocks in the SD card. As a result, context switching from creating the directory blocks to writing data blocks may slow down the write process. By pre-allocating the space needed to write the media file, the storage blocks for all directory information are put together at the front, and they are followed by the blocks pointed to by the directory blocks sequentially in order. In this way, interruptions to the write process caused by switching between creating directory blocks and writing data blocks are avoided and speed is increased.

The write process 305 finds 3052 the next block of data in the circular buffer shared with the read process 304, and then writes 3053 the block of data to the SD card 140. After writing 3053 the block of data, the write process 305 checks 3054 for the end of the file. If the end of the file is not found, the write process returns to step 3052 to find the next block of data in the buffer and repeats steps 3052-3054 until the end of the file is found.

In one embodiment, the read process 304 and write process 305 operate in parallel to read and write data to the unsecure area 141 of the SD card 140. In one embodiment, the read process 305 begins by reading the playable content portion of the media file first. Because the playable content portion of the file is the rate limiting step for the overall transfer of the media file (because of its relatively large size), the writing of the playable content portion is preferentially started first and runs essentially continuously until the playable content portion has be written to the unsecure area 141 of the SD card 140. While the playable content portion is being written 305, the metadata process 306 and the content key process 307 also execute.

The metadata process 306 begins with creating and writing 3061 the metadata file. The metadata file includes, for example, the metadata and the parts of DRM information that are written to the unsecure area 141 of the SD card 140. Then chapter images are written 3062 to the SD card 140, if any. The chapter images are images that represent the chapters in on-screen displays and/or menus and can be selected to navigate the playable content on a playback device. Then the media product image is written 3063. The media product image may include images that would accompany the media sold or rented in conventional channels, for example the box cover art or the album cover.

As the metadata process is executing 306, the content key process 307 also executes. In step 3071, the usage rules are created. Recall the usage rules are a set of rules specifying the access rights to the playable content portion of the media file that have been purchased by the customer. A copy of the usage rules applicable to the playable content being transferred to the SD card 140 is obtained for transfer to the SD card 140 as well. Then, in step 3072, an encrypted content key and an encrypted set of usage rules are created and queued for transfer to the SD card 140.

It has been found that because the metadata process 306 and the content key process 307 treat relatively small amounts of data as compared to the playable content portion, the execution of these processes only mildly interferes with the continuous writing of the playable content portion. For example, although transferring a full-length movie to an SD card 140 may take approximately 2 minutes, the other smaller portions only mildly interfere with the writing of the movie for a few seconds. After the first few seconds of writing the movie to the SD card 140 during which the metadata is also written to the SD card 140, the movie gets the benefit of exclusive access to the SD card writer 136 for the duration of the download.

Finally, in step 308, if writing data to the unsecure area 141 of the SD card 140 successfully completes, the encrypted content key and usage rules are written to the secure area 142 of the SD card 140. Although the data intended for the secure area is prepared in the content key process 307 that executes as the read process 304, write process 305, and metadata process 306 execute, so that there are no delays once the data finishes writing to the unsecure area 141 of the SD card 140, the secure data is not written to the SD card 140 until the end of the method 300 for two main reasons. First, writing to the secure area 142 of the SD card slows down the write process 305. Thus, any data (other than the user key which is written as part of an initial set-up of the SD card 140) to be written to the secure area 142 is queued to be written at the end to avoid delays caused by switching back and forth between the unsecure area 141 and the secure area 142 of the SD card 140. Secondly, by waiting until the end of the method 300, if there is any kind of problem with the payment for the transaction through the transaction module 134 or with the transfer of the media file to the SD card 140, the kiosk 130 can abort the transfer without writing the data to the secure area 142 of the SD card 140. As a result, no matter what portion of the media file has been downloaded to the SD card 140 prior to the transfer process being aborted, the customer will not be able to playback any playable content that was downloaded to the SD card 140 without the data that needs to be in the secure area 142 (i.e., the encrypted content key and the usage rules). Thus, the owners of the intellectual property rights in the media file gain a measure of protection against people who may try to abscond with a copy of the media file without proper payment. As a result, using the method 300 described in FIG. 3, media files can be quickly and securely transferred from a kiosk 130 to an SD card 140.

The example method 300 described with reference to FIG. 3 can be adapted to describe the transfer of multiple media files. Steps 301-307 each run separately for each of the multiple media files, however step 302 need only be performed the first time to check the media key ID and the user key ID (because it will be the same for the subsequent media files). After all of the data is written to the unsecure area 141 of the SD card 140 for all of the multiple media files, step 308 is executed one time to write all the data to the secure area 142 of the SD card 140, provided that the transaction successfully completes. As a result, according to an embodiment of the configurations noted, the process of transferring multiple media files to the SD card 140 avoids delays that would be caused by switching back and forth between writing to the unsecure 141 and secure 142 areas of the SD card 140. The streamlined process increases efficiency and manufacturing (or creating) SD cards with desired content in real time (or "on the fly").

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, e.g., in FIGS. 1, 2 and 3. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. The one or more processors 202 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Modules may constitute either software modules (e.g., code embodied on a machine-readable medium or in a transmission signal) or hardware modules. A "hardware module" is a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. The hardware modules may be regarded as being communicatively coupled. Where multiple of such hardware modules exist contemporaneously, communications may be achieved through signal transmission (e.g., over appropriate circuits and buses) that connect the hardware modules. Software may accordingly configure a processor, for example, to constitute a particular hardware module at one instance of time and to constitute a different hardware module at a different instance of time.

The various operations of example methods described herein, e.g., in FIG. 3, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of methods in FIGS. 1-3 may be performed by one or processors 202 or processor-implemented hardware modules. The performance of certain of the operations may be distributed among the one or more processors, not only residing within a single machine, but deployed across a number of machines. The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, the process noted in FIG. 3. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," and "content," or the like. These words, however, are merely convenient labels and are to be associated with appropriate physical quantities.

Unless specifically stated otherwise, discussions herein using words such as "processing," "computing," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a high-speed secure content transfer to an SD card from a kiosk through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A kiosk for transferring content to a secure digital (SD) card, the kiosk comprising:
   a customer interface module for receiving a customer's selection of a plurality of media files to transfer to the SD card;
   a media file request module for requesting the plurality of media files and corresponding metadata file for each media file from a server communicatively coupled to the kiosk;
   a server interaction module for receiving the requested plurality of media files and the corresponding metadata files from the server;
   a transaction module for accepting payment from a customer for the customer's selection of the plurality of media files to transfer to the SD card;
   an SD card writer for writing data to an unsecure user area of the SD card and a protected secure area of the SD card; and
   a media file processing module for preparing the plurality of media files and the corresponding metadata files to be written to the SD card in cooperation with the SD card writer, wherein space is pre-allocated on the SD card for writing an encrypted playable content portion of each media file to an unsecure area of the SD card, and wherein, except for a user key, data to be written to the unsecure area of the SD card is queued for writing in advance of data to be written to a secure area of the SD card, such that the data to be written to the unsecure area is written in time before the data to be written to the secure area is written, and wherein the playable media files are encrypted by a content key that is encrypted by the user key.

2. The kiosk of claim 1, further comprising a preview module for playing a preview of content of selected by the customer through the kiosk while the SD card writer writes the plurality of media files to the SD card, wherein the preview of content selected by the customer includes content from the plurality of media files being written to the SD card.

3. The kiosk of claim 1, further comprising a firmware update module for transferring a firmware update to the SD card.

4. The kiosk of claim 1, further comprising a software player update module for transferring a software player update to the SD card.

5. The kiosk of claim 1, further comprising a customer attraction module for playing segments from media files currently available for download from the kiosk while the kiosk is not used for purchase of a media file.

6. The kiosk of claim 1, further comprising a USB port to allow connection of the SD card with a USB adapter to the kiosk.

7. A method of quickly and securely transferring media files from a kiosk to a secure digital (SD) card, the method comprising:
   identifying a media file for download to the SD card;
   pre-allocating space on the SD card for a playable content portion of the media file, wherein the playable content portion of the media file is encrypted by a content key that is encrypted by a user key;
   writing all directory blocks of the playable content portion of the media file together and, thereafter in time, writing all data blocks sequentially of the playable content portion of the media file; and
   writing all data that is to be written to an unsecure area of the SD card, including the encrypted playable content, prior in time to writing any data to a secure area of the SD card, except for the user key.

8. The method of claim 7, wherein, except for a user key, data is only written to the secure area of the SD card if a transaction for the media file successfully completes.

9. The method of claim 7, wherein the SD card is pre-configured with the user key stored in the secure area of the SD card.

10. The method of claim 7, further comprising:
    writing the user key to the secure area of the SD card prior in time to writing all data to the unsecure area of the SD card; and
    writing other data to the secure area of the SD card after in time writing all data to the unsecure area of the SD card.

11. The method of claim 7, where the directory blocks are optionally written at once.

12. A non-transitory computer readable storage medium storing instructions thereon, the instructions when executed cause at least one processor to:
    identify a media file for download to an SD card;
    pre-allocate space on the SD card for a playable content portion of the media file, wherein the playable content portion of the media file is encrypted by a content key that is encrypted by a user key;
    write all directory blocks together of the playable content portion of the media file and, thereafter in time, write all data blocks sequentially of the playable content portion of the media file; and
    write all data that is to be written to an unsecure area of the SD card, including the encrypted playable content, prior in time to writing any data to a secure area of the SD card, except for the user key.

13. The computer readable storage medium of claim 12, wherein, except for a user key, data is only written to the secure area of the SD card if a transaction for the media file successfully completes.

14. The computer readable storage medium of claim 12, wherein the SD card is pre-configured with the user key stored in the secure area of the SD card.

15. The computer readable storage medium of claim 12, further comprising instructions that when executed cause the at least one processor to:
    write the user key to the secure area of the SD card prior in time to a write of all data to the unsecure area of the SD card; and
    write other data to the secure area of the SD card after in time a write of all data to the unsecure area of the SD card.

16. The computer readable storage medium of claim 12, where the directory blocks are optionally written at once.

17. The computer readable storage medium of claim 12 wherein the instructions cause the media file to be downloaded to the SD card in substantially 2 minutes.

18. The method of claim 7 wherein the media file is downloaded to the SD card in substantially 2 minutes.

* * * * *